May 30, 1944.  P. MOSIER  2,350,062
CART
Filed Oct. 11, 1943

Inventor
Peter Mosier
By Liverance & Van Antwerp
Attorneys

Patented May 30, 1944

2,350,062

UNITED STATES PATENT OFFICE 2,350,062

CART

Peter Mosier, Grand Rapids, Mich.

Application October 11, 1943, Serial No. 505,715

9 Claims. (Cl. 280—87.01)

This invention relates to a cart of simple, practical, durable and economical construction which may either be pushed from behind or pulled from in front, being quickly converted from one to the other. It is an object and purpose of the present invention to provide a front wheel support for the cart with a novel and especially strong and durable steering control arrangement therefor and without any openings in the bottom of the cart which are not closed when the cart is fully assembled. At the rear of the cart a pushing handle means is provided which is releasably locked and held in operative position by merely turning the handles to their upper operative position and quickly unlocked, whereupon the handles may be turned downwardly within the body of the cart.

Various other objects and purposes than those enumerated for the production of a sturdy durable and yet economically constructed cart will appear as an understanding of the invention is had from the following description, taken in connection with the accompanying drawing, in which, Fig. 1 is a plan view of the cart made in accordance with my invention.

Like reference characters refer to like parts in the different figures of the drawing.

Figure 1:
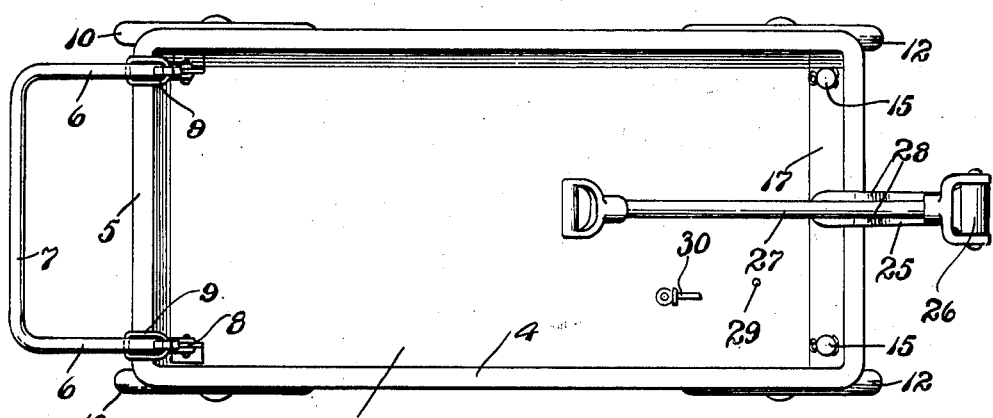

The body of the cart comprises a bottom 1 of metal, vertical ends 2 and vertical sides 3 which may be made of separate parts permanently connected together as shown or all stamped from a single piece of metal. At the upper edges of the body a frame 4 of angle bar cross section is shown having an outwardly extending horizontal flange 5. This frame is permanently secured in place and likewise may be replaced by a reinforcement for the upper edge portions of the body consisting of an outturned flange, like the flange 5, made integral with and at the upper edges of the ends and sides of the body.

Figure 2:
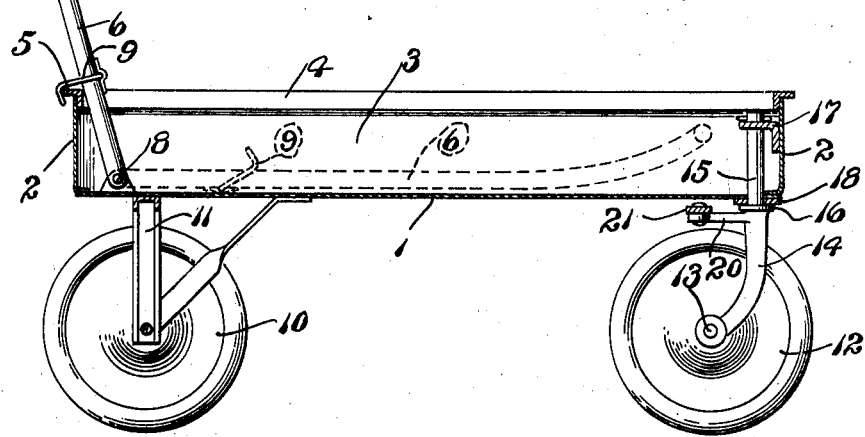
Fig. 2 is a longitudinal vertical section therethrough.

At the rear of the cart a pushing handle is made of rod or tubular material having spaced apart sides 6 connected by an integral cross member 7. The inner ends of the sides 6 are pivotally mounted at 8 on suitable brackets secured to the upper side of the bottom and near the rear end of the cart. Hooks 9 are pivotally mounted on the sides 6 a distance above the lower end such that when the handle is moved to substantially upright position, as in Fig. 2, the hooks 9 automatically engage with the flange 5 at the rear of the cart. Such hooks may be lifted to disengage from said flange and the handle turned to lie within the body of the cart as in dotted lines in Fig. 2.

The body of the cart is supported at its rear end by the usual wheels 10 on an axle mounted on a suitable rear support 11 of any conventional or suitable construction.

Figure 5:
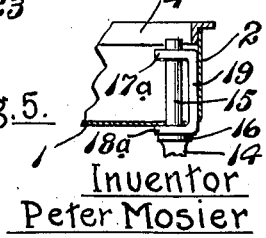
Fig. 5 is a detail in section showing a slight modification in one part of the structure from that shown in Fig. 2.

The front wheels 12 are each mounted on a laterally and outwardly extending axle pin 13 one at the lower end of each of two arms 14 which extend downwardly from a vertical pin or post 15 the lower portions of the arms 14 being curved to the rear as shown. At the juncture of an arm 14 and a post 15 an integral collar 16 of greater diameter than the post 15 is formed. The posts 15 extend through openings to pass them in the bottom 1 of the cart body and at their upper ends pass through suitable openings in the horizontal leg of an angle bar 17 permanently secured to and at the rear side of the front end 2 of the body a distance above the bottom. At the lower side of the bottom a flat bar 18 of metal extending the width of the body is provided and permanently secured to strengthen and reinforce the cart body at its front end the posts 15 passing therethrough. In Fig. 5 an equivalent construction is shown wherein the flat bar 18 and the angle bar 17 are replaced by a channel having a vertical web 19 and upper and lower flanges 17a and 18a secured at the rear side of the front end 2 of the body, the flange 18a extending underneath the bottom 1 and the post 15 passing through the flanges 17a and 18a.

A horizontal arm 20 extends rearwardly from each of the arms 14 directly below the collar 16. Between said arms a flat bar 21 extends and at its ends has pivotal connection to the arms, said bar being located a short distance below the bottom 1 of the body.

Figure 4:
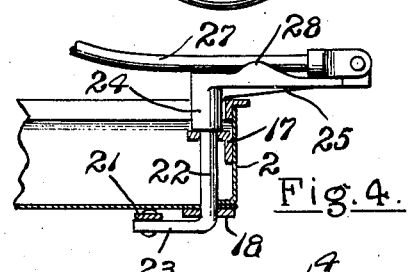
Fig. 4 is a fragmentary vertical section of the front end of the cart showing the pulling tongue in the position which it occupies when the cart is to be pushed from behind.

A vertical steering post 22 passes through alined openings in the bars 17 and 18 substantially midway between the posts 15 and at its lower end has a rearwardly extending horizontal arm 23 which may be integral with the post 22 or such arm may be a separate part and permanently secured to said post to be integral in effect. The arm 23 extends at its rear end to the bar 21 and has a pivotal connection therewith. The upper end of the post 22 has a permanent connection, integral or otherwise, with an enlarged vertical extension 24 to the post which reaches above the upper edge of the front end of the body. A horizontal arm 25 extends forwardly from the enlarged upper portion 24 of the steering post and is provided at its front end with an upwardly extending boss 26. A tongue 27 at its front end is provided with a fork which is pivotally connected to the boss 26 so that it may be turned to the rear to lie upon the arm 25 which at each side is provided with an upwardly extending ear 28, between which the tongue 27 lies when in its rear position as in Figs. 1 and 4. The tongue may be turned to a forward position in which it may be utilized for pulling the cart. When the tongue is in the rear position, as in Figs. 1 and 4, the cart may be pushed from behind and when the pushing handle is turned to its lower dotted line position in Fig. 2 the tongue may be swung forward and the cart drawn thereby. It is also apparent that with the tongue in the position shown in Fig. 1 and with the rear handles in the dotted line position shown in Fig. 2 the cart may be utilized, as frequently done by children in operating said cart with one knee in the cart and the foot of the opposite leg engaging the ground.

Figure 3:
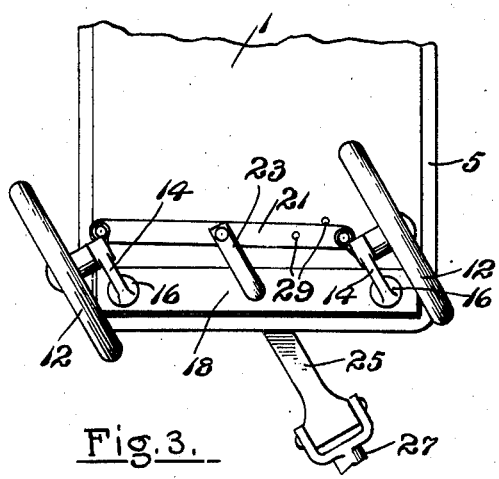
Fig. 3 is a fragmentary under plan view of the front end of the cart.

The bar 21 connecting the steering arms or knuckles 20 has an opening therethrough as at 29 (Fig. 3), and the bottom 1 a similar opening which will aline therewith when the wheels 12 are at central position. Through the openings a locking pin 30 may be inserted to lock the front wheels against movement as may be desirable when the cart is pushed from behind.

The construction of cart described is strong and durable being particularly reinforced at its front and where the heaviest strains occur. The cart will not readily tip over and is almost instantly converted from a cart which may be pushed to one which may be pulled and vice versa.

The invention is defined in the appended claims and is to be considered comprehensive of all forms of structure coming within their scope.

I claim:

1. In a construction of the class described, a body of sheet metal having a bottom and a front end extending upwardly at right angles thereto, reinforcing means located at the front of said body having a portion rigidly attached to the front end of the body interiorly thereof with a horizontal portion extending to the rear, said reinforcing means also comprising an additional horizontally located means underneath the body, said horizontal portion and means having alined openings therein, posts rotatably mounted in said openings and extending downwardly underneath said body, wheels mounted at the lower ends of the posts, and means for simultaneously oscillating the posts, said last mentioned means being underneath the bottom of the body.

2. A construction of the class described, comprising a body of sheet metal having a horizontal bottom and a front end extending upwardly therefrom, a horizontal reinforcing member having an inwardly extending horizontal flange secured within and to the front end of the body, a second horizontal reinforcing member located underneath the body below said flange, said flange and second reinforcing member having spaced alined openings therein, posts rotatably mounted in said openings and extending underneath the body, wheels mounted at the lower end of the posts, an arm extending from each post underneath the body, a tie member pivotally connected at its ends to the ends of said arms and located underneath and adjacent the bottom of the body, and means mounted on said body adjacent its front end and operable from above the body connected with said tie member for moving said tie member longitudinally to oscillate the posts and change the direction of movement of said wheels.

3. A construction containing the elements in combination defined in claim 2, the bottom of said body and said tie member having openings therein which are brought into alinement when the wheels are located in substantially central position, and a removable pin for passing through said openings to releasably lock said tie member against movement with respect to the body.

4. In a structure of the class described, a body having a horizontal bottom member and vertically extending sides and front, said bottom having three openings located near the front end of the body, substantially vertical posts passing through and rotatable in the two end openings, reinforcing means secured to the front of the body at its inner side, additional reinforcing means extending along the under side of the body, all said reinforcing means having openings in conjunction with the openings in the bottom of the body, said posts extending downwardly below the body, a lateral axle at the lower end of each post, a wheel mounted on each of said axles, a horizontal arm extending in a generally rearward direction from each of said posts a short distance below the bottom of the body, a tie member connecting said arms for simultaneous rotation of the posts, a vertical member rotatably mounted in the third openings of the body, said member at its lower end having a rearward extension pivotally connected with said tie member and a tongue member at the top of the vertical member for turning the same for changing the direction of movement of the wheels.

5. In a structure of the class described, a cart body having a bottom and sides and ends, rear wheels located underneath the body and connected thereto, movable front wheels connected to the body, means for guiding the front wheels, handle means pivotally connected within and adjacent the rear of the body, said handle means being of less length than the length of the body, and hook means for detachably connecting the handle means with the upper portion of the rear end of the body and holding said handle means in a substantially upright position.

6. In a structure of the class described, a cart body having sides and ends, rear wheels connected with said body for supporting the same at its rear and movable front wheels connected to said body underneath its front end, means for guiding the front wheels, handle means pivotally connected at its lower end to the bottom of said body within the same and a short distance from the rear end thereof, and hook means pivotally connected to said handle means in a position to engage with the upper edge of the rear end of the body when turned to an upright position, said hooks means being disengageable whereby the handle means may be turned forwardly to lie within the body, said handle means being of less length than the interior length of the body.

7. In combination, a cart, wagon or the like having a rectangular shaped body portion of sheet metal, including a vertically extending front, a bar of substantially angle iron form having a vertical and a horizontal leg located interiorly at the end of said body and secured thereto with the horizontal leg extending to the rear, a flat bar of metal located under and transverse of the body and secured thereto in parallelism to the horizontal leg of said first bar, said horizontal leg, said bottom bar and the bottom of the body having alined substantially vertical openings therein adjacent each side of the body, a post extending through and rotatably mounted in each of said alined openings, said post extending below the body and having a wheel at its lower end, means connecting said post for simultaneously turning the same in the same direction thereby changing the direction of movement of said wheels, said last mentioned means comprising a horizontal member located under and closely adjacent the bottom of the body.

8. In combination, a wagon, cart or the like having a rectangular shaped body of sheet metal including a vertical front end, transverse reinforcing means located against the front end of said body and connected thereto including two vertically spaced horizontal portions one immediately underneath the bottom of the body and the other a distance thereabove, said horizontal portions and the bottom of the body having alined openings adjacent each side of the body, two vertical posts extending through said openings at their upper portions and rotatable therein, said posts extending downwardly below the bottom of the body, wheels mounted to turn on horizontal axes at the lower ends of the posts, a horizontal arm extending rearwardly from each post a short distance below the bottom of the body, a tie member connecting the rear ends of said arms, and means for moving said tie member longitudinally to simultaneously turn said posts and change the direction of movement of said wheels.

9. A construction containing the elements in combination defined in claim 8, said horizontal portions of the reinforcing member and the bottom of the body having additional alined openings substantially midway between the first mentioned openings therethrough, said means for moving the tie member including a third post extending through said openings and rotatably mounted therein, a horizontal arm at the lower end of the third post extending rearwardly therefrom and pivotally connected at its rear end to said tie member, and a tongue connected to the upper end of the post, whereby the wagon or cart may be drawn and the third post turned about its vertical axis, as specified.

PETER MOSIER.